United States Patent
Faccin et al.

(10) Patent No.: US 7,330,905 B2
(45) Date of Patent: Feb. 12, 2008

(54) METHOD TO IMPROVE THE INFORMATION DISTRIBUTION IN A COMMUNICATION NETWORK

(75) Inventors: Stefano M. Faccin, Dallas, TX (US); Franck Le, Irving, TX (US); Hannu Flinck, San Jose, CA (US)

(73) Assignee: Spyder Navigations L.L.C., Wilmington, DE (US)

( * ) Notice: Subject to any disclaimer, the term of this patent is extended or adjusted under 35 U.S.C. 154(b) by 894 days.

(21) Appl. No.: 10/318,391

(22) Filed: Dec. 13, 2002

(65) Prior Publication Data

US 2004/0117505 A1 Jun. 17, 2004

(51) Int. Cl.
*G06F 15/173* (2006.01)
*G06F 15/177* (2006.01)

(52) U.S. Cl. .................................... 709/242; 709/220

(58) Field of Classification Search ................ 709/220, 709/242

See application file for complete search history.

(56) References Cited

U.S. PATENT DOCUMENTS 6,240,080 B1 * 5/2001 Okanoue et al. ............ 370/338
6,804,720 B1 * 10/2004 Vilander et al. ............. 709/229
6,859,448 B1 * 2/2005 Roy ............................ 370/338
6,957,262 B2 * 10/2005 Kimura et al. .............. 709/227

OTHER PUBLICATIONS

T. Narten, et al., Neighbor discovery for IP Version 6 (Ipv6), RFC 2461, Internet Engineering Task Force, Dec. 1998.
David B. Johnson, et al., Mobility Support in IPv6, Internet draft, Internet Engineering Task Force, Jul. 2001.
G. Renker, et al., Paging Concept for IP based Networks, Internet draft, Internet Engineering Task Force, Sep. 2001.
A. Conta et al., Internet Control Message Protocol (ICMPv6) Specification, RFC 1885, Internet Engineering Task Form, Dec. 1995.

* cited by examiner

*Primary Examiner*—Ario Etienne
*Assistant Examiner*—Avi Gold
(74) *Attorney, Agent, or Firm*—Foley & Lardner LLP

(57) ABSTRACT

A method of distributing information in a communication network, wherein first advertisement messages are distributed in broadcast with a certain repetition frequency, the first advertisement messages providing information directed to connectivity purposes which are specific to the communication network; second advertisement messages are available for a distribution at a lower frequency as the first advertisement messages, the second advertisement messages providing other information; and the second advertisement messages comprising an elongated structure with respect to the first advertisement messages.

32 Claims, 4 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|  Subtypes ...                                                 |
+-+-+-+-+-+-+-+-+-+-+-+-+-+-+-+-+-+-+-+-+-+-+-+-+-+-+-+-+-+-+-+-+
```

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|a|b|c|d|e|f|g|h|i|j|k|l|m|n|o|p|q|r|s|t|u|v|w|x|y|z|a|b|c|d|e|f|
+-+-+-+-+-+-+-+-+-+-+-+-+-+-+-+-+-+-+-+-+-+-+-+-+-+-+-+-+-+-+-+-+
|  Options ...
+-+-+-+-+-+-+-+-+-+-+-+-
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|   Version     |i|j|k|l|m|n|o|p|q|r|s|t|u|v|w|x|y|z|a|b|c|d|e|f|
+-+-+-+-+-+-+-+-+-+-+-+-+-+-+-+-+-+-+-+-+-+-+-+-+-+-+-+-+-+-+-+-+
|  Options ...
+-+-+-+-+-+-+-+-+-+-+-+-
```

FIG. 3

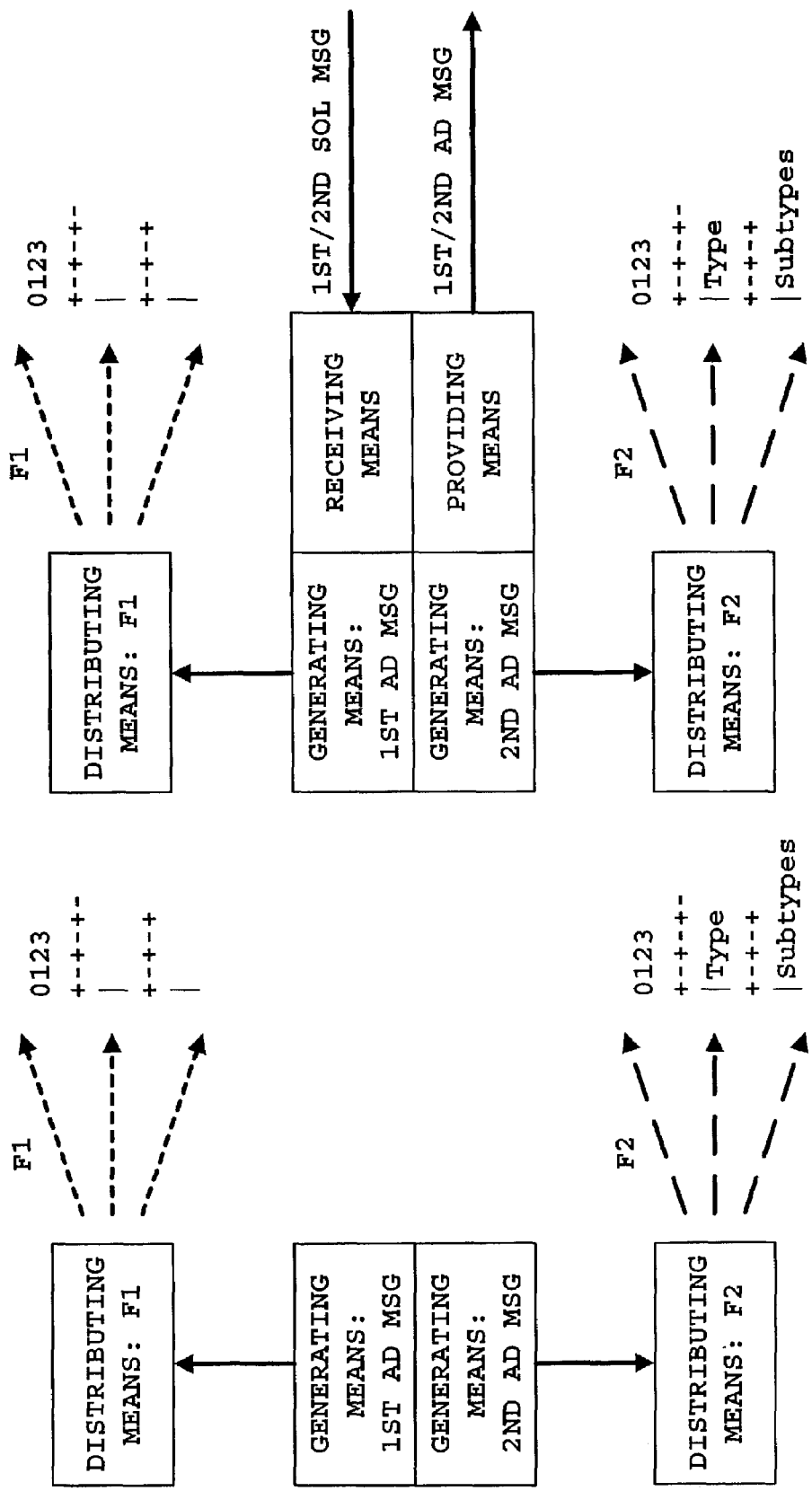

METHOD TO IMPROVE THE INFORMATION DISTRIBUTION IN A COMMUNICATION NETWORK

BACKGROUND OF THE INVENTION

1. Field of the Invention

The present invention relates to a method for improving the information distribution in a communication network. The present invention is considered to be particularly applicable to any kind of IP networks.

2. Related Background Art

In networks which are based on the Internet Protocol (hereinafter shortly IP), when a host needs to get IP connectivity, it needs first to learn different information regarding the network such as the default router, the prefix information to be used for address auto-configuration, what type of address allocation mechanisms are to be used (stateless or stateful), etc.

As disclosed by T. Narten et al., "Neighbor Discovery for IP Version 6 (IPv6)", RFC 2461, Internet Engineering Task Force, December 1998, router advertisement messages have been defined in order to carry this necessary information to the hosts. That is, router advertisement messages have been defined in order to carry all the information necessary to the user to get IP connectivity and provide already a quite long set of information.

Currently, several Internet Engineering Task Force (hereinafter shortly IETF) Working Groups are requesting to extend the router advertisement message to carry additional information. For example, the Internet draft by David B. Johnson et Charles Perkins, "Mobility Support in IPv6", Internet Engineering Task Force, July 2001, proposes to extend the format of the router advertisement message by the addition of a flag bit to indicate that the router sending the advertisement message is serving as a home agent on this link.

Further, the IP Paging mechanisms according to G. Renker et al., "Paging Concept for IP based Networks", Internet draft, Internet Engineering Task Force, September 2001, need a paging area identity to be broadcasted, and it is currently suggested to extend the router advertisement for this purpose.

Still further, regarding the Hierarchical Mobile IP (HMIP) according to A. Conta et S. Deering, "Internet Control Message Protocol (TCMPv6) for the Internet Protocol Version 6 (IPv6) Specification", RFC 1885, Internet Engineering Task Force, December 1995, it is also currently suggested to use the router advertisement to provide the information related to the mobile anchorpoint (MAP) entities such as the distance, the preference, the mode, the lifetime, the IP addresses, and other information to the user.

With the Protocol for carrying Authentication for Network Access (PANA), it is proposed to add to router advertisements the identity of the PANA agent which the host should contact to register to the network, or an identity to provide the host with information about the need to register with a different PANA agent.

In conclusion, there is a clear trend according to which router advertisement messages may get very long. Although the length of router advertisement messages may not be a problem in traditional IP networks, when a wireless access link is used (in particular for cellular links) the length of the messages becomes a significant issue. Currently, router advertisement messages are sent in broadcast very frequently; but in case of long messages the frequency would have to be reduced considerably when the access link is wireless to avoid wasting too much bandwidth. Moreover, not every host needs all the information contained in a router advertisement. For example, the IP nodes which only request IP connectivity are not interested in the identity of paging area, MAP information, etc., whereas some users may only be interested in some parts of the information.

SUMMARY OF THE INVENTION

It is an object of the present invention to overcome the shortcomings of the prior art and to provide a method of distributing information in a communication network having an improved efficiency.

The present invention is a method of distributing information in a communication network, wherein first advertisement messages are distributed in broadcast with a certain repetition frequency, the first advertisement messages providing information directed to connectivity purposes which are specific to the communication network; second advertisement messages are available for a distribution at a lower frequency as the first advertisement messages, the second advertisement messages providing other information; and the second advertisement messages comprising an elongated structure with respect to the first advertisement messages.

Here, the communication network can be based on any version of the Internet Protocol.

Optionally, the lower frequency may be zero so that the second advertisement messages are only available upon request.

In the method according to the present invention a capability of the second advertisement messages can be signaled with a respective indication in the first advertisement messages.

The above is also accomplished by providing a method of distributing information in a communication network, wherein first advertisement messages are distributed in broadcast with a certain repetition frequency, the first advertisement messages providing information directed to connectivity purposes which are specific to the communication network; second advertisement messages are available for a distribution at a lower frequency as the first advertisement messages, the second advertisement messages providing other information; the second advertisement messages comprising an elongated structure with respect to the first advertisement messages; the first and second advertisement messages are solicited by a requesting entity by respective first and second solicitation messages; and the second solicitation messages specify the type of information to be provided by the second advertisement messages.

Again, the communication network can be based on any version of the Internet Protocol, and optionally, the lower frequency may be zero so that the second advertisement messages are only available upon request.

According to this method, the type of information to be provided by the second advertisement messages according to the specification of the second solicitation messages follows a system definition for the communication network, or the type of information to be provided by the second advertisement messages according to the specification of the second solicitation messages corresponds to individual requests of the respective soliciting entities.

In the latter case, the second advertisement messages would be sent in unicast only to respective soliciting entities.

Since either method according to the present invention allows the router advertisement messages to only carry the necessary information for IP connectivity, while other information is provided either upon request from the user, or advertised less frequently than the current version of the router advertisement messages, this method according to the present invention allows to keep the router advertisement short and to save the number of bytes sent over the access link in broadcast. The information can actually be sent only when needed (i.e. requested by the hosts and sent in unicast instead of broadcast). This is important in wireless links where bandwidth is limited and expensive.

The present invention is also a system for distributing information in a communication network, comprising means for generating first advertisement messages, wherein the first advertisement messages provide information directed to connectivity purposes which are specific to the communication network; means for distributing the first advertisement messages in broadcast with a certain repetition frequency; means for generating second advertisement messages, wherein the second advertisement messages provide other information and comprise an elongated structure with respect to the first advertisement messages; and means for making the second advertisement messages available for a distribution at a lower frequency as the first advertisement messages.

In this system according to the present invention the communication network may be based on any version of the Internet Protocol, and further, the lower frequency may be zero so that the means for making the second advertisement messages available provide them only upon request.

Moreover, the means for generating the first advertisement messages can indicate a capability of the second advertisement messages by inserting a respective indication in the first advertisement messages.

Further, the present invention is a system for distributing information in a communication network, comprising means for generating first advertisement messages, wherein the first advertisement messages provide information directed to connectivity purposes which are specific to the communication network; means for distributing the first advertisement messages in broadcast with a certain repetition frequency; means for generating second advertisement messages, wherein the second advertisement messages provide other information and comprise an elongated structure with respect to the first advertisement messages; means for making the second advertisement messages available for a distribution at a lower frequency as the first advertisement messages; means for receiving first and second solicitation messages from a requesting entity, wherein the second solicitation messages specify the type of information to be provided by the second advertisement messages; and means for providing the first and second advertisement messages according to the solicitation by respective first and second solicitation messages.

Again, the communication network may be based on any version of the Internet Protocol, and the lower frequency is zero so that the second advertisement messages are only available upon request.

Further, the means for providing the first and second advertisement messages according to the solicitation by respective first and second solicitation messages may comprise a system definition for the communication network defining the type of information to be provided by the second advertisement messages according to the specification of the second solicitation messages.

On the other hand, the means for providing the first and second advertisement messages according to the solicitation by respective first and second solicitation messages may be implemented such that the type of information to be provided by them according to the specification of the second solicitation messages corresponds to individual requests of the respective soliciting entities.

In this case, the means for making the second advertisement messages available can send the second advertisement messages in unicast only to respective soliciting entities.

The present invention is yet also an IP host for obtaining distributed information in a communication network, comprising means for receiving first advertisement messages distributed in broadcast with a certain repetition frequency, wherein the first advertisement messages provide information directed to connectivity purposes which are specific to the communication network; and means for receiving second advertisement messages available for a distribution at a lower frequency as the first advertisement messages, wherein the second advertisement messages provide other information and comprise an elongated structure with respect to the first advertisement messages.

In the IP host according to the present invention, the communication network may be based on any version of the Internet Protocol, and the lower frequency may be zero so that the second advertisement messages are only available upon request and the means for receiving them do also perform such request.

As an advantageous modification, the means for receiving first advertisement messages also retrieve a capability of the second advertisement messages when signaled with a respective indication in the first advertisement messages.

Still further, the present invention is an IP host for obtaining information in a communication network, comprising means for receiving first advertisement messages distributed in broadcast with a certain repetition frequency, wherein the first advertisement messages provide information directed to connectivity purposes which are specific to the communication network; means for receiving second advertisement messages available for a distribution at a lower frequency as the first advertisement messages, wherein the second advertisement messages provide other information and comprise an elongated structure with respect to the first advertisement messages; means for generating first and second solicitation messages, wherein the second solicitation messages specify the type of information to be provided by the second advertisement messages; and means for soliciting the first and second advertisement messages by respectively generated first and second solicitation messages.

Here, the communication network may be based on any version of the Internet Protocol, and further, the lower frequency may be zero so that the second advertisement messages are only available upon request and the means for receiving them do also perform such request.

As an alternative, the means for generating the first and second solicitation comprise a system definition for the communication network defining the type of information to be provided by the second advertisement messages according to the specification of the second solicitation messages.

As another alternative, the means for generating the first and second solicitation messages are implemented for individually requesting the type of information to be provided by the second advertisement messages.

In the latter alternative, the means for receiving the second advertisement messages also receive them when sent in unicast only to respective soliciting entities.

BRIEF DESCRIPTION OF THE DRAWINGS

Further details, advantages and features of the present invention will become apparent from the following detailed description of the preferred embodiments thereof which is to be taken in conjunction with the appended drawings, in which:

FIG. 1 shows a long version of a router advertisement as a first preferred embodiment of the present invention;

FIG. 2 shows an extended router solicitation message format as a second preferred embodiment of the present invention;

FIG. 3 shows another extended router solicitation message format as a third preferred embodiment of the present invention;

FIG. 6 shows the system according to the present invention;

FIG. 7 shows a modification of the system according to the present invention;

DETAILED DESCRIPTION OF THE PREFERRED EMBODIMENTS

Figure 5:
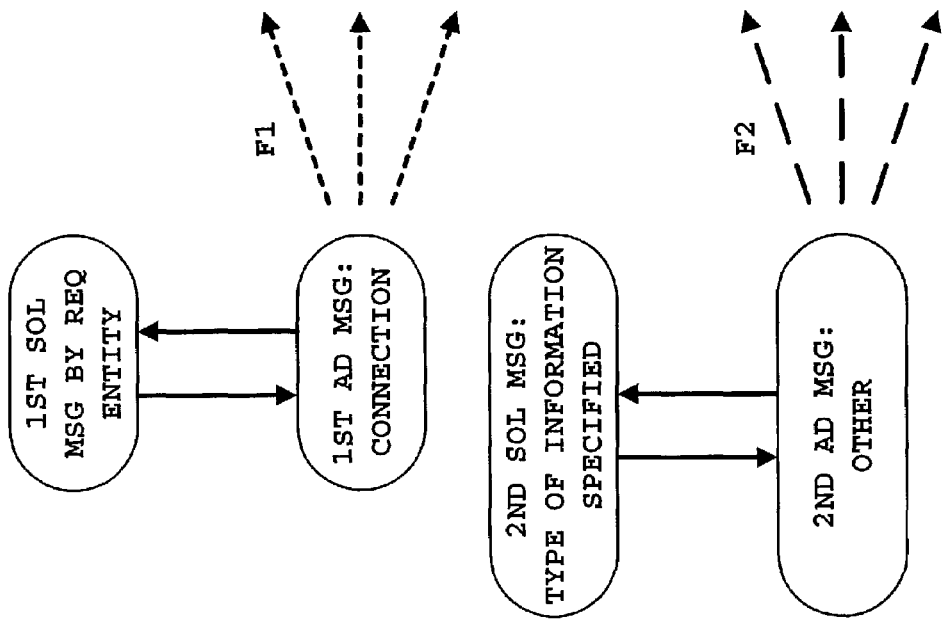
FIG. 5 shows a modification of the method according to the present invention.

According to the present invention, a method, system and IP host are proposed which allow efficient distribution of information to IP hosts through router advertisement messages, thus avoiding a negative impact on the access link and allowing for a large set of information to be provided to IP hosts.

Accordingly, a new router advertisement and a new router solicitation type is defined as follows.

Firstly, in addition to the current router advertisement message (type 134) according to T. Narten et al., "Neighbor Discovery for IP Version 6 (IPv6)", RFC 2461, Internet Engineering Task Force, December 1998, a new router advertisement type called extended router advertisement message (a long version of the existing router advertisement) is proposed, wherein the current version of the router advertisement messages as defined by T. Narten et al., "Neighbor Discovery for IP Version 6 (IPv6)", RFC 2461, Internet Engineering Task Force, December 1998, is used to provide only the necessary information to get IP connectivity (i.e. the same information as currently available), while the extended router advertisement message carries the additional information.

As an option, the capability for the extended router advertisements could be signaled with a bit in the regular router advertisements. Then the host could solicit the information faster.

Secondly, the new extended router solicitation type allows hosts to specify what type of information is requested. Specifically, a host can send a regular router solicitation message as defined by T. Narten et al., "Neighbor Discovery for IP Version 6 (IPv6)", RFC 2461, Internet Engineering Task Force, December 1998, to request for a router advertisement. In this case, the routers receiving the router solicitation message return a regular router advertisement. In addition, according to the present invention, a host can send an extended router solicitation message to request for an extended router advertisement. The routers receiving the extended router solicitation message return an extended router advertisement containing all the information which would be specified for the extended router advertisement.

Or, a host can send an extended router solicitation message to request for an extended router advertisement, wherein the extended router solicitation message specifies what information is required (e.g. the identity of a paging area). The routers receiving the extended router solicitation message return an extended router advertisement containing only the information requested by the host in the extended router solicitation.

According to the present invention, the regular router advertisement messages are still sent in broadcast to the IP hosts as is currently defined by T. Narten et al., "Neighbor Discovery for IP Version 6 (IPv6)", RFC 2461, Internet Engineering Task Force, December 1998. However, the extended router advertisement message is sent in broadcast to hosts only at a frequency lower than the one for regular router advertisements (e.g. with a 1:50 relation).

In addition, the extended router advertisement messages are sent to hosts in unicast upon the receipt of an extended router solicitation sent by a host. The information contained in the solicited extended router advertisement corresponds to the information requested by the host in the extended router solicitation.

It is also possible that extended router advertisement messages are never sent in broadcast but only upon solicitation, i.e. that, according to the above, the frequency with which they are sent is zero.

Then, in turn, the host might request both types of router advertisement messages by setting a flag in the router advertisement solicitation message to request extended information.

If it is desired to guarantee that the extended information is consistent, the periodical nature of the extended router advertisement message would necessarily have to be maintained. For instance, in case the network provider changes the network configuration the new information will be propagated to the host by these periodic messages. This would minimize solicitation bursts as well if a large group of routers appears into the subnet. Otherwise, the router advertisements could be sent whenever one of the parameters is modified to inform the users of the change.

The preferred embodiments of the present invention are to standardize two new ICMPv6 (Internet Control Message Protocol Version 6) types and corresponding messages, i.e. one for the long (extended) router advertisement message, and one for the specific router solicitation message.

First Embodiment

Long Version of Router Advertisement

The extended router advertisement messages will be either periodically sent or in response to an extended router solicitation message.

The extended router advertisement message according to a first preferred embodiment of the present invention is shown in FIG. 1.

As for the IP fields, the source address must be the link-local address assigned to the interface from which this message is sent.

The destination address would typically be the source address of an invoking router solicitation or the all-nodes multicast address.

The hop limit can be maximum, i.e. 255.

If a security association for the IP authentication header exists between the sender and the destination address, then the sender should include this header.

The type would have to be determined, while the code is 0 and the checksum (the ICMP checksum) is according to A. Conta et S. Deering, "Internet Control Message Protocol (ICMPv6) for the Internet Protocol Version 6 (IPv6) Specification", RFC 1885, Internet Engineering Task Force, December 1995.

The subtypes will carry the additional information specified by some working groups of the IETF. Their format would also to be defined by working groups of the IETF.

Second Embodiment

Extended Router Solicitation

The hosts send extended router solicitations in order to prompt routers to generate extended router advertisements quickly.

The extended router solicitation message needs to be assigned a new type value by the Internet Assigned Numbers Authority (IANA).

As for the message format, listing the subtype values may appear as the most intuitive way to implement this mechanism, but considering the length of the subtype field (8 bits), the specific router solicitation may quickly become long.

So in order to reduce the message length, another possibility could be to use flags as shown by FIG. 2. Each flag will correspond to a specific piece of information and this will allow the access router to know which information to send in the extended router advertisement.

Third embodiment

Extended Router Solicitation

However, the solution according to the second embodiment may have an issue, particularly concerning the extensibility of this mechanism. If more than 32 different types of information need to be specified in the future, this model can not support it.

A way to solve this would be to have a version number as shown in FIG. 3. The first version would allow the use of the first 24 bits. If more then need to be specified in the future, a next version can be defined allowing a longer number of bits or letting the bits correspond to other types of information.

As one possible way to implement the method according to the present invention the routers can quickly process the messages, since only by looking at the type of the messages, the routers know whether it is a regular or an extended router solicitation.

As another possible way to implement the present invention, the extended router solicitation could be implemented as an extension of the current router solicitation according to T. Narten et al., "Neighbor Discovery for IP Version 6 (IPv6)", RFC 2461, Internet Engineering Task Force, December 1998. That is, the requested information would be indicated as options of this message.

There are many other different ways to implement the mechanism, e.g. as another alternative that might be more scaleable, but would require more structure in the message format, a type, length, value (TLV) type of approach can also be adopted. That is, the version field can be divided into type and length portions. This would look like that the first four bits of the version field would express the version or type, the next four bits the length of the following structure. The length would be expressed in eight bit octets giving enough space.

Figure 4:
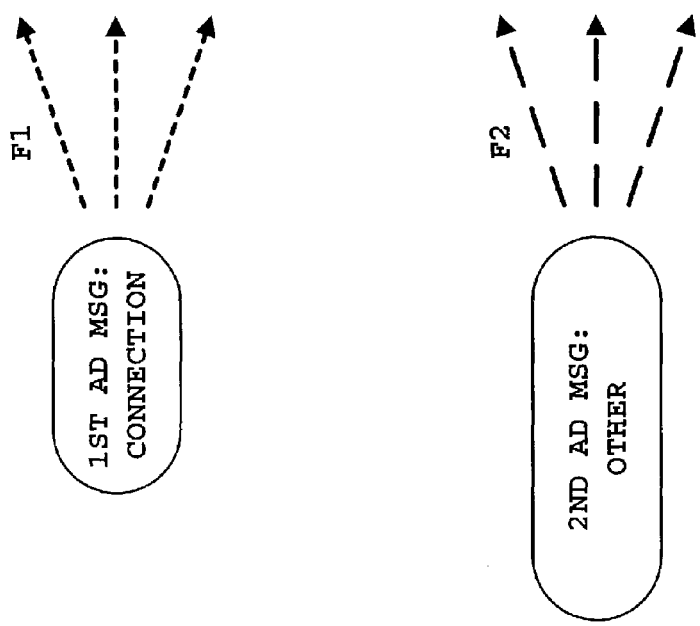
FIG. 4 shows the method according to the present invention.

Accordingly, as depicted in FIG. 4, the method of distributing information in a communication network according to the present invention comprises that first advertisement messages ($1^{st}$ ad msg.) are distributed in broadcast with a certain repetition frequency F1, wherein the first advertisement messages provide information which are directed to connectivity purposes being specific to the communication network. As shown in the lower part of FIG. 4, second advertisement messages ($2^{nd}$ ad msg.) are made available for a distribution at a lower frequency F2 as the first advertisement messages, i.e. F2<F1, wherein the second advertisement messages provide information other than for connectivity purposes. As described above, the second advertisement messages comprise an elongated structure with respect to the first advertisement messages.

Referring to FIG. 5, there is shown a modification of the method according to the present invention. In detail, there is shown a method as described above under reference to FIG. 4, but wherein the first and second advertisement messages are in addition solicited by a requesting entity by respective first and second solicitation messages. Due to the allowed varying scope of the frequencies F1, F2, including F2=0, the first and second advertisement messages may thus be solicited upon need. According to the above, the second solicitation messages specify the type of information to be provided by the second advertisement messages.

Referring now to FIGS. 6 and 7, there is shown the system according to the present invention and a modification thereof.

Specifically, FIG. 6 shows the system for distributing information in a communication network according to the present invention, wherein means generate first advertisement messages providing information directed to connectivity purposes which are specific to the communication network, as described above. Further, there are means for distributing the first advertisement messages in broadcast with a certain repetition frequency F1. On the other hand, additional means generate second advertisement messages, wherein the second advertisement messages provide other information and comprise an elongated structure with respect to the first advertisement messages, and which are made available by still further means for a distribution at a lower frequency F2 as the first advertisement messages.

As a modification thereto, FIG. 7 illustrates the case when additional means are provided so that the first and second advertisement messages can be separately solicited and are correspondingly provided. That is, the system for distributing information in a communication network according to the present invention further comprises, with respect to the system according to FIG. 6, means for receiving first and second solicitation messages from a requesting entity, wherein the second solicitation messages specify the type of information to be provided by the second advertisement messages, and means for providing the first and second advertisement messages according to the solicitation by respective first and second solicitation messages.

Figure 9:
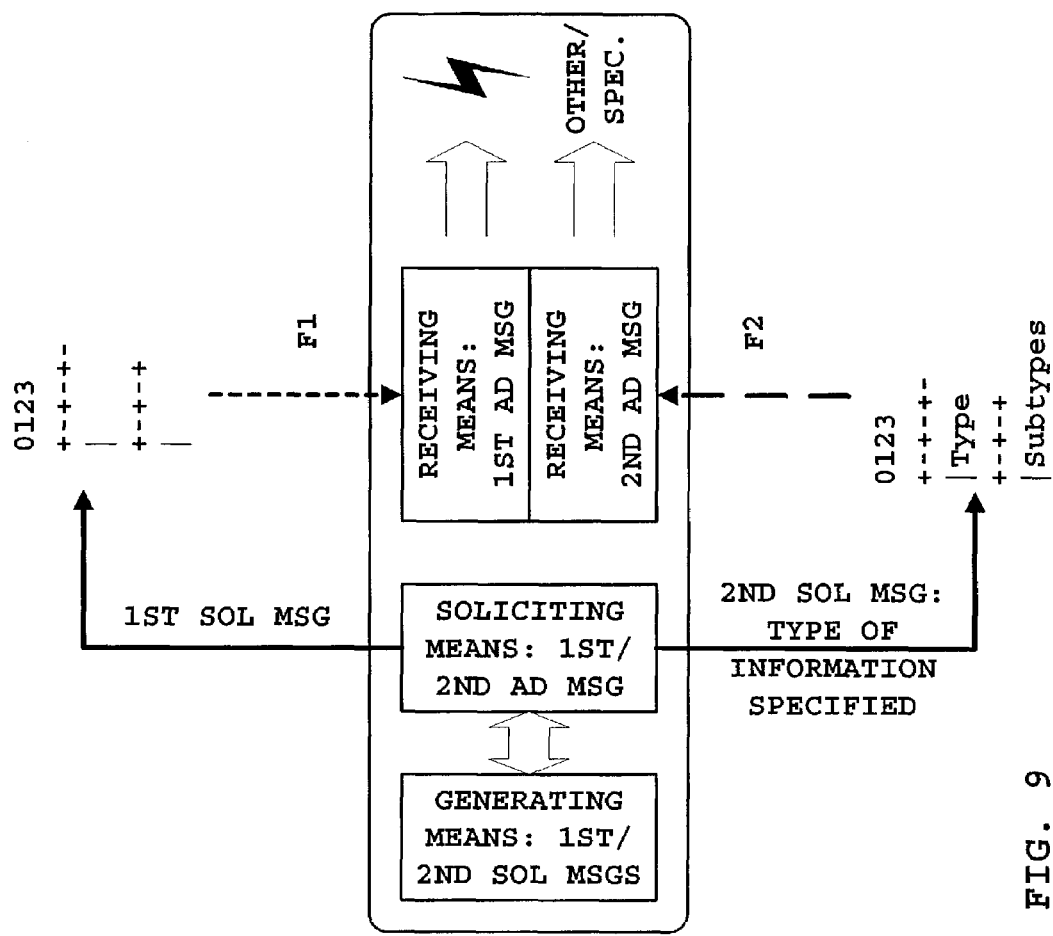
FIG. 9 shows a modification of the IP host according to the present invention.
Figure 8:
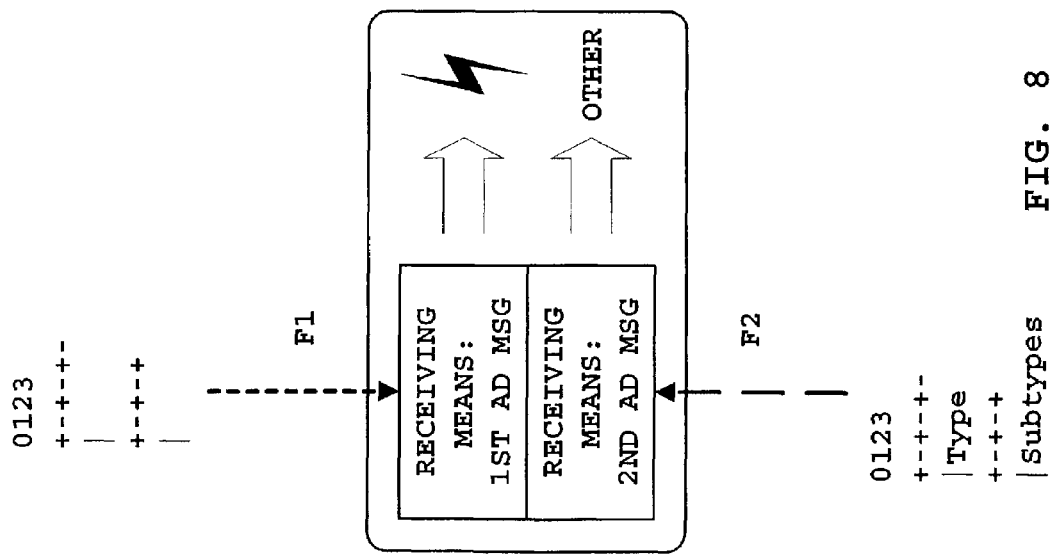
FIG. 8 shows the IP host according to the present invention.

Finally, FIGS. 8 and 9 show the IP host for obtaining information in a communication network according to the present invention, comprising means for receiving first advertisement messages distributed in broadcast with a certain repetition frequency F1, wherein the first advertisement messages provide information directed to connectivity purposes which are specific to the communication network, means for receiving second advertisement messages available for a distribution at a lower frequency F2 as the first advertisement messages, wherein the second advertisement messages provide other information and comprise an elongated structure with respect to the first advertisement messages.

With respect to FIG. 8, FIG. 9 additionally shows, as a modification to the IP host according to the present invention, means for generating first and second solicitation messages, wherein the second solicitation messages specify the type of information to be provided by the second advertisement messages, and means for soliciting the first and second advertisement messages by respectively generated first and second solicitation messages. Again, the first and second advertisement messages may be separately solicited and are thus correspondingly provided.

Thus, what is described above is a method of distributing information in a communication network, wherein first advertisement messages are distributed in broadcast with a certain repetition frequency, the first advertisement messages providing information directed to connectivity purposes which are specific to the communication network; second advertisement messages are available for a distribution at a lower frequency as the first advertisement messages, the second advertisement messages providing other information; and the second advertisement messages comprising an elongated structure with respect to the first advertisement messages.

While it has been described above what is presently considered to be the best mode of carrying out the present invention, it is apparent to those who have skill in the art that various modifications can be made without departing from the spirit and scope of the present invention as is defined by the appended claims.

The invention of claimed is:

1. A method of sending connectivity information to devices to establish a communication network, the method comprising:
   broadcasting a first advertisement message from a first device at a first repetition frequency, wherein the first advertisement message comprises a first number of bits that include first information related to connecting to the first device; and
   sending a second advertisement message from the first device at a second repetition frequency, wherein the second advertisement message comprises a second number of bits that include second information, the second information including information not included in the first information;
   wherein the second repetition frequency is less than the first repetition frequency; and
   further wherein the first number of bits is less than the second number of bits.

2. The method of claim 1, wherein the first device is a router.

3. The method of claim 1, wherein sending the second advertisement message comprises broadcasting the second advertisement message.

4. The method of claim 1, further comprising receiving a request message from a second device at the first device, the request message including a request to send the second advertisement message.

5. The method of claim 4, wherein the request message includes an indicator identifying a type of information to include in the second information.

6. The method of claim 5, further comprising identifying the second information at the first device based on the indicator.

7. The method of claim 1, further comprising identifying the second information at the first device based on a network definition.

8. The method of claim 1, wherein the first information includes an indicator indicating a capability of the first device to send the second advertisement message.

9. A device for sending connectivity information to additional devices to establish a communication network, the device comprising:
   a message generator, the message generator configured to define a first advertisement message and to define a second advertisement message, wherein the first advertisement message comprises a first number of bits that include first information related to connecting to the device, wherein the second advertisement message comprises a second number of bits that include second information, the second information including information not included in the first inlbrmation; and
   a communication interface, the communication interface configured to broadcast the first advertisement message at a first repetition frequency and to send the second advertisement message at a second repetition frequency;
   wherein the second repetition frequency is less than the first repetition frequency; and
   further wherein the first number of bits is less than the second number of bits.

10. The device of claim 9, wherein the communication interface is configured to broadcast the second advertisement message.

11. The device of claim 9. wherein the communication interface is further configured to receive a request message from a second device, the request message including a request to send the second advertisement message.

12. The device of claim 11, wherein the request message includes an indicator identifying a type of information to include in the second information.

13. The device of claim 12, wherein the message generator is further configured to identify the second information based on the indicator.

14. The device of claim 9, wherein the message generator is further configured to identify the second information based on a network definition.

15. The device of claim 9, wherein the first information includes an indicator that indicates a capability of the device to send the second advertisement message.

16. A method of obtaining connectivity information to establish a communication network, the method comprising:
   receiving a first advertisement message at a first device broadcast from a second device at a first repetition frequency, wherein the first advertisement message comprises a first number of bits that include first information related to connecting to the second device; and
   receiving a second advertisement message at the first device sent from the second device at a second repetition frequency, wherein the second advertisement message comprises a second number of bits that include second information, the second information including information not included in the first information;
   wherein the second repetition frequency is less than the first repetition frequency; and
   further wherein the first number of bits is less than the second number of bits.

17. The method of claim 16, wherein the first device is an Internet protocol host.

18. The method of claim 16, wherein the second advertisement message is broadcast from the second device.

19. The method of claim 16, further comprising sending a request message to the second device from the first device, the request message including a request to send the second advertisement message.

20. The method of claim 19, wherein the request message includes an indicator identifying a type of information to include in the second information.

21. The method of claim 16. wherein the first information includes an indicator that indicates a capability of the second device to send the second advertisement message to the first device.

22. A device for obtaining connectivity information to establish a communication network, the device comprising:
   a communication interface, the communication interface configured to receive a first advertisement message broadcast from a second device at a first repetition frequency and to receive a second advertisement message sent from the second device at a second repetition frequency; and
   a message processor, the message processor configured to identify a first number of bits from the received first advertisement message, the first number of bits including first information related to connecting to the second device, and to identify a second number of bits from the received second advertisement message, the second number of bits including second information, the second information including information not included in the first information;
   wherein the second repetition frequency is less than the first repetition frequency; and
   further wherein the first number of bits is less than die second number of bits.

23. The device of claim 22, wherein the communication interface is configured to receive the second advertisement message broadcast from the second device.

24. The device of claim 22, further comprising a message generator, the message generator configured to define a request message, wherein the communication interface is further configured to send the request message to the second device, the request message including a request to send the second advertisement message.

25. The device of claim 24, wherein the request message includes an indicator identifying a type of information to include in the second information.

26. The device of claim 22, wherein the first information includes an indicator that indicates a capability of the second device to send the second advertisement message.

27. A system for distributing connectivity information among devices to establish a communication network, the system comprising:
   a first device, the first device comprising
      a message generator, the message generator configured to define a first advertisement message and to define a second advertisement message. wherein the first advertisement message comprises a first number of bits that include first information related to connecting to the first device, wherein the second advertisement message comprises a second number of bits that include second information, the second information including information not included in the first information; and
      a first communication interface, the first communication interface configured to broadcast the first advertisement message at a first repetition frequency and to send the second advertisement message at a second repetition frequency; and
   a second device, the second device comprising
      a second communication interface, the second communication interface configured to receive the first advertisement message and the second advertisement message from the first device; and
      a message processor, the message processor configured to identify the first number of bits from the received first advertisement message and to identify the second number of bits from the received second advertisement message to establish communication with the first device:
   wherein the second repetition frequency is less than the first repetition frequency; and
   further wherein the first number of bits is less than the second number of bits.

28. The system of claim 27. wherein the first communication interface is configured to broadcast the second advertisement message.

29. The system of claim 27, wherein the second device further comprises:
   a second message generator, the second message generator configured to define a request message, the request message including a request to send the second advertisement message;
   wherein the second communication inter ace is further configured to send the request message; and
   further wherein the first communication interface is further configured to receive the request message.

30. The system of claim 29, wherein the first device further comprises a message processor, the message processor configured to identify an indicator from the received request message, the indicator identifying a type of information to include in the second information.

31. The system of claim 27, wherein the first information includes an indicator that indicates a capability of the first device to send the second advertisement message.

32. The system of claim 27, wherein the first information and the second information are used to establish communication between the first device and the second device.

* * * * *

UNITED STATES PATENT AND TRADEMARK OFFICE
CERTIFICATE OF CORRECTION

PATENT NO. : 7,330,905 B2
APPLICATION NO. : 10/318391
DATED : February 12, 2008
INVENTOR(S) : Stefano Faccin, Franck Le and Hannu Flinck It is certified that error appears in the above-identified patent and that said Letters Patent is hereby corrected as shown below:

In Claim 9, Column 10, Line 18:
Delete the word "inlbrmation" and replace it with the word --information--.

In Claim 22, Column 11, Line 33:
Delete the word "die" and replace it with the word --the--.

In Claim 29, Column 12, Line 38:
Delete the words "inter ace" and replace them with --interface--.

Signed and Sealed this

Twenty-fourth Day of June, 2008

JON W. DUDAS
*Director of the United States Patent and Trademark Office*